US005805704A

United States Patent [19]

Hsu

[11] Patent Number: 5,805,704

[45] Date of Patent: Sep. 8, 1998

[54] METHOD AND APPARATUS FOR PROTECTING BROADCAST SOFTWARE AGAINST UNAUTHORIZED RECEPTION ON A SOFTWARE BROADCASTING SYSTEM

[75] Inventor: Shih-Pin Hsu, Tai-Nan, Taiwan

[73] Assignee: United Microelectronics Corp., Hsin-Chu, Taiwan

[21] Appl. No.: 573,961

[22] Filed: Dec. 15, 1995

[51] Int. Cl.[6] .......... H04L 9/00

[52] U.S. Cl. .......... 380/48

[58] Field of Search .......... 380/48, 20

[56] References Cited

U.S. PATENT DOCUMENTS

| | | | |
|---|---|---|---|
| 3,651,261 | 3/1972 | Guanella | 380/48 |
| 3,852,534 | 12/1974 | Tilk | 380/48 |
| 4,071,693 | 1/1978 | Frutiger | 380/48 |
| 4,361,890 | 11/1982 | Green, Jr. et al. | 380/48 |
| 4,418,425 | 11/1983 | Fennel, Jr. et al. | 380/48 |
| 4,663,500 | 5/1987 | Okamoto et al. | 380/48 |
| 4,689,606 | 8/1987 | Sato | 380/48 |
| 4,723,283 | 2/1988 | Nagasawa et al. | 380/48 |
| 4,803,726 | 2/1989 | Levine et al. | 380/48 |
| 5,530,756 | 6/1996 | Bourel et al. | 380/20 |

*Primary Examiner*—Salvatore Cangialosi

*Attorney, Agent, or Firm*—Baker & Botts, L.L.P.

[57] ABSTRACT

Disclosed is a method and apparatus provided on a game software broadcasting system for protecting the broadcast game software against unauthorized reception after the prescribed period of authorized reception expires. The method and apparatus allows the subscriber to receive and use the broadcast software within the prescribed period of authorized reception, and beyond that period the subscriber will not able to receive correctly decoded data of the broadcast software. The method and apparatus uses a timer on the transmitting site for clocking off the encoding process and uses another timer on the receiving site for clocking off the decoding process. The operating frequency of the decoding clock signal is prescribed with a specific deviation from that of the encoding clock signal. The deviation is prescribed based on the period of authorized reception given to the subscriber. The decoding clock signal is initially set in synchronization with the encoding clock signal at the time the service begins. The deviation will cause the decoding clock signal to be out of synchronization after the prescribed period of authorized reception expires, thereby causing the receiving site unable to decode the received data of the broadcast software. To continue the authorization, the renewal can be made on the line by setting a resetting signal to reset the decoding clock signal back into synchronization with the encoding clock signal.

27 Claims, 6 Drawing Sheets

METHOD AND APPARATUS FOR PROTECTING BROADCAST SOFTWARE AGAINST UNAUTHORIZED RECEPTION ON A SOFTWARE BROADCASTING SYSTEM

BACKGROUND OF THE INVENTION

1. Field of the Invention

The present invention relates to the field of digital data communication, and more specifically, to a method and apparatus provided on a game software broadcasting system for protecting game software distributed via cable TV networks or direct broadcast satellite (DBS) against unauthorized reception.

2. Description of Prior Art

Video game machines (or called video game consoles) are small-scale computers that allow users to play video games. As shown in FIG. 1, a conventional video game machine 300 can play video game software stored on a cartridge 200. The video game machine 300 is normally composed of a main unit 310 housing the main control and processing units for the playing of the video game, a joystick 320 for the player to make controls, and a display 330 for displaying the animation of the video game. Typically, the main unit 310 is composed of I/O interface 311, RAM module 312, CPU 313, audio processor 314, VRAM (Video RAM)module 315, video processor 316, and video signal synthesizer 317. The cartridge 200 includes mask ROM module 240 (which can also be EPROMs or EEPROMs) for permanent storage of the software programs of particular video game titles and is usually made replaceable so that users can purchase various cartridges to play different video games. The system shown in FIG. 1 is conventional art and intended only for introductory purpose so that description of the operation will not be detailed.

It is a disadvantage of the foregoing type of video game machine that in order to play a great variety of video games, the player must purchase a large number of cartridges that contain all the video games the player wishes to play, which is quite cost-consuming. In response, there is nowadays arising a game software broadcasting distribution service that features regional broadcasting of game software via cable-TV network or direct broadcast satellite (DBS) links. In this kind of service, the subscriber needs to purchase or rent a game machine accompanied with a dedicated cartridge (here the cartridge is used to house a dedicated receiver that can decode the signal of the broadcast software) for downloading game software to the game machine via a cable TV line or satellite link. A typical plan of such a system is shown in FIG. 2, in which the numeral 200A indicates the aforementioned dedicated cartridge. The dedicated cartridge 200A includes a special receiver 210 for receiving and decoding the software broadcast from a software broadcasting station 100 via a channel 400 which can be a cable TV line or a satellite link. Besides, ROM module 230 are used to store the decoding routine and RAM module 220 are used for temporary storage of decoded game software and data.

Just like subscribing a cable TV service, the player must pay for authorized reception and use of the game software on his/her game machine via the cable or satellite link. The authorized period of use is usually dependent on the amount of the fee the player paid. After the expiration date, if the player wishes to continue the service, he/she should pay another amount of fee so as to obtain another period of authorized reception and use of the game software. Accordingly, it is important for the service company to provide means that can protect the broadcast software against unauthorized reception by nonsubscribers as well as against unauthorized continuous use after expiration date by subscribers.

To solve the problem, a prior art method is to provide a device trademarked KeyPro, which is inserted in the parallel port and stores authorization data as the expiration date that allows the game machine to compare it to the real-time clock so as to determine whether the current date is still within the authorized period for the player to play the game software. On workstations, a common prior art method is to use a license file that stores the authorization data; and each time any licensed programs are to be executed, the expiration date is read out from the license file to see whether the current date is still within the authorized period. If and only if yes, the licensed programs can be executed. These prior art methods can protect the software against unauthorized use of the software. However, it is a drawback of these prior art methods that since the authorization data is built on firmware or software, it could still be deciphered and copied by ingenious infringers such that it can be used on other machines unauthorized to use the software. Therefore, software firmware- or software-based protection is not suitable for use on software broadcasting systems. There thus exists a need for a method that can provide protection against unauthorized reception and use of broadcast software and is difficult for infringers to gain unauthorized reception and use of the broadcast software.

SUMMARY OF THE INVENTION

It is therefore a primary objective of the present invention to provide a method and apparatus for allowing time-limited reception of broadcast software on a software broadcasting system. The method is capable of automatically causing the receiving site unable to decode the received data after the authorized period expires.

It is another objective of the present invention to provide a broadcast software protecting method and apparatus which is not software-based so that there is no way for infringers to gain unauthorized reception by copying authorization data.

It is still another objective of the present invention to provide a broadcast software protecting method and apparatus which allows the renewal of authorized reception and use of the broadcast software to be made quickly on the line.

In accordance with the foregoing and other objectives of the present invention, there is provided with a novel method and apparatus for protecting broadcast digital information against unauthorized reception. The method comprises the following steps of (1) encoding the digital information according to a first time base; (2) transmitting the encoded digital information via a channel to the receiving site; (3) receiving the encoded digital information on the receiving site; and (4) decoding the received digital information according to a second time base, decoded output being correct if the second time base is in synchronization with the first time base, and incorrect if out of synchronization. The first time base is a first clock signal of first frequency and the second time base is a second clock signal of second frequency having a predetermined deviation from the first frequency and initially set in synchronization with the first clock signal.

Based on the foregoing method, the apparatus comprises (a) encoding means, provided on the transmitting site, for encoding the digital information; (b) encoding timer means, coupled to the encoding means, for generating an encoding clock signal at an encoding frequency for clocking off the encoding means; (c) decoding means, provided on the receiving site, for decoding received data of the digital information; (d) transmitting means for transmitting encoded game software via a channel to the receiving site; (e) decoding timer means, coupled to the decoding means, for generating a decoding clock signal at a decoding frequency for clocking off the decoding means; and (f) synchronization controlling means for setting the encoding timer means and the decoding timer means in synchronization with each other. On the receiving site, when the deviation between the decoding frequency and the encoding frequency accumulated to a delay that causes the decoding timer means to be out of synchronization with the encoding timer means after the authorized period of reception expires, the receiving site will be unable to decode the received data of the digital information.

Further, the synchronization controlling means can generate a resetting signal for resetting the decoding timer means back into synchronization with the encoding timer means. A subscriber ID code can be included in the resetting signal so that only the subscriber with that ID code can receive the resetting signal. The encoding means includes a plurality of encoding ROM modules each storing a transfer function for encoding the game software to be transmitted, the plurality of encoding ROM modules being enabled sequentially by the encoding timer means so as to generate a series of data packets carrying the digital information to the receiving site; and the decoding means includes a plurality of decoding ROM modules each storing a decoding routine, the plurality of decoding ROM modules being enabled sequentially by the decoding timer means so that each data packet is decoded by corresponding decoding ROM module.

BRIEF DESCRIPTION OF DRAWINGS

The present invention can be more fully understood by reading the subsequent detailed description of the preferred embodiments thereof with references made to the accompanying drawings, wherein:

FIGS. 5A–5B are waveform diagrams, wherein FIG. 5A shows an example in which the transmitted data and received data are in synchronization (decoding can be done) and FIG. 5B shows an example in which the transmitted data and received data are out of synchronization (decoding cannot be done)

DETAILED DESCRIPTION OF PREFERRED EMBODIMENT

In the following detailed description of a preferred embodiment, the present invention is utilized specifically on a game software broadcasting system that broadcasts game software via cable or satellite links to the subscribers. However, it is to be understood here that the application of the present invention is not limited to the game software broadcasting system. Broadly speaking, it can be utilized on any digital data communication system that transmit digital information from a transmitting site to a receiving site for the purpose of allowing the receiving site only a time-limited period of authorized use.

Figure 1:
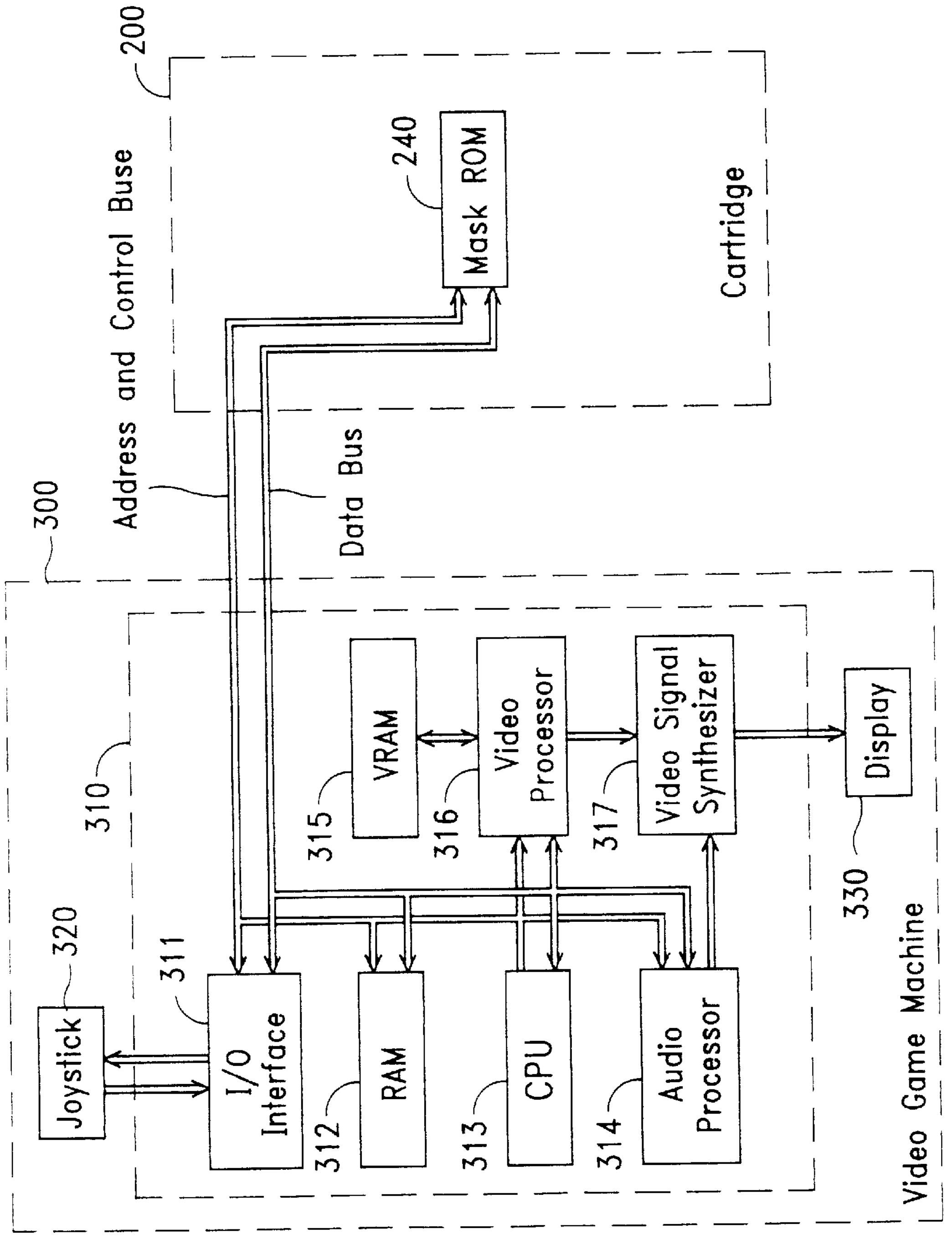
FIG.1 (Prior Art)
FIG. 1 shows a schematic block diagram of a typical game machine.
Figure 2:
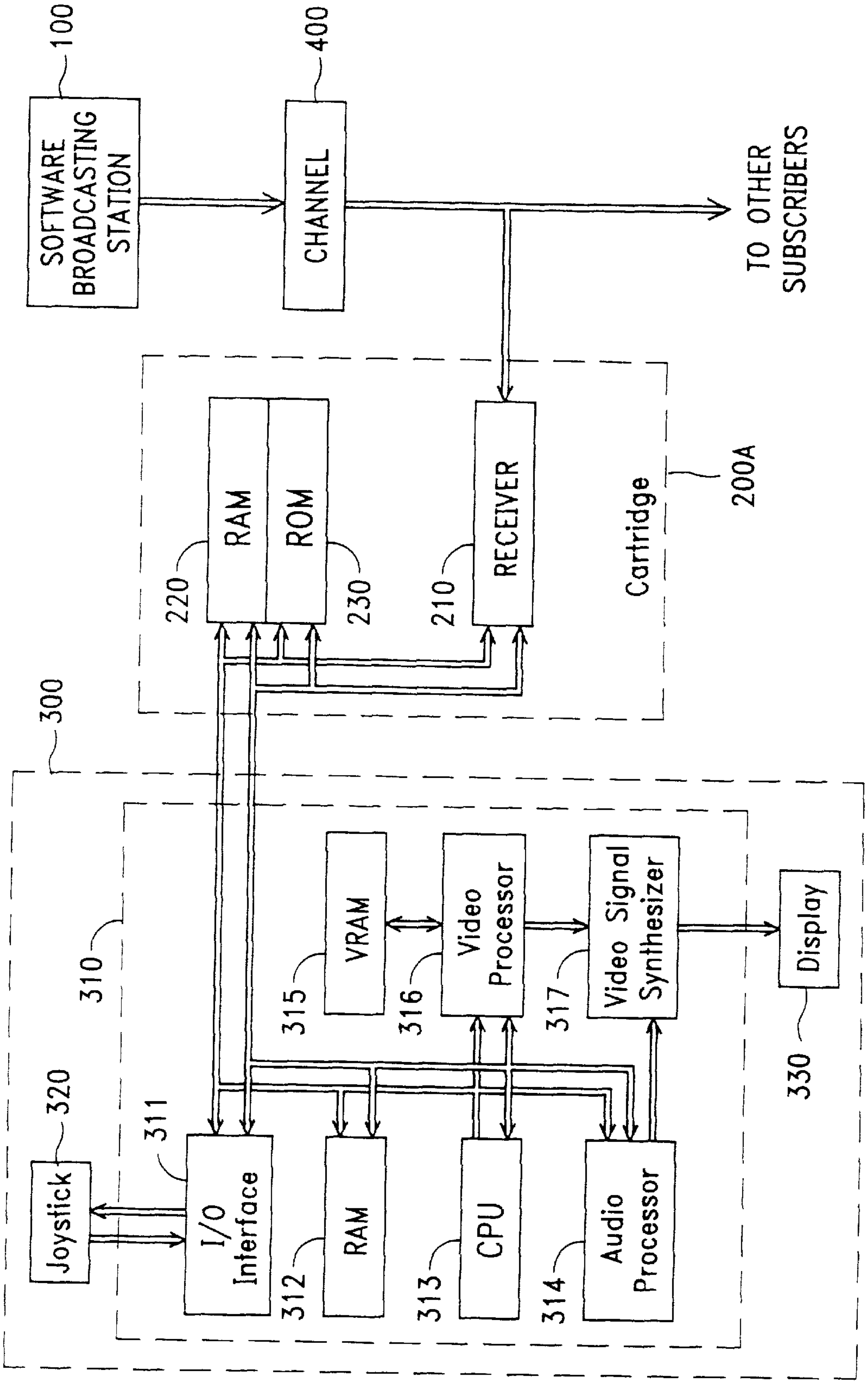
FIG.2 (Prior Art)
FIG. 2 shows a schematic block diagram of a typical software broadcasting system that broadcasts game software via a channel as cable TV line or satellite link to a game machine.
Figure 3:
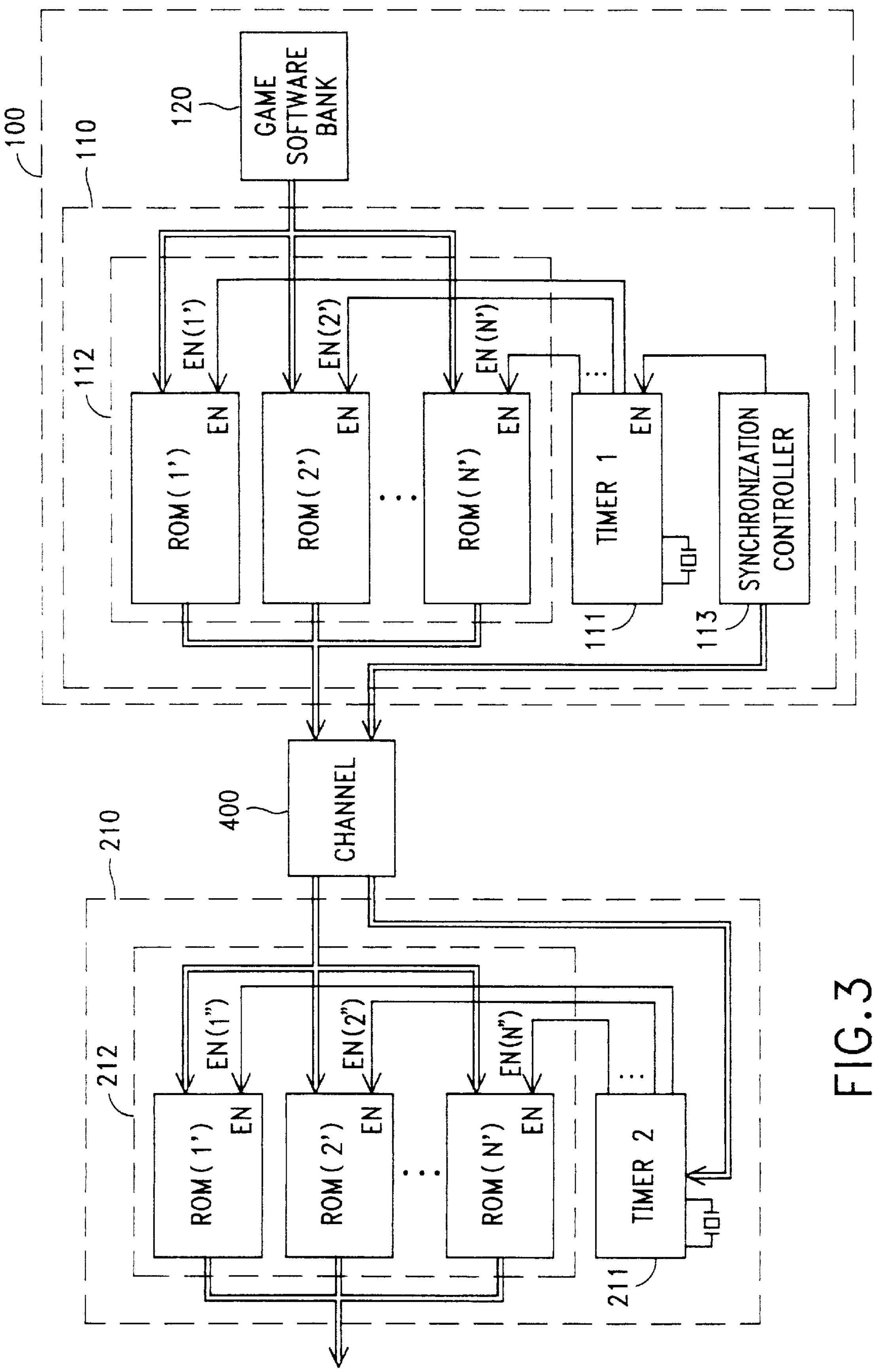
FIG. 3 shows a schematic block diagram of the apparatus according to the present invention.

Referring to FIG. 3, there is shown a schematic diagram used to depict how a software broadcasting system employs the method according to the present invention for protecting the broadcast software against unauthorized reception. On the transmitting site, the software broadcasting station 100 includes a game software bank 120 containing game software that can be encoded by a transmitter 110 to be transmitted via the channel 400 to the subscribers; and on the receiving site, a subscriber can link his/her dedicated cartridge between the channel 400 and the game machine 300.

Figure 4A:
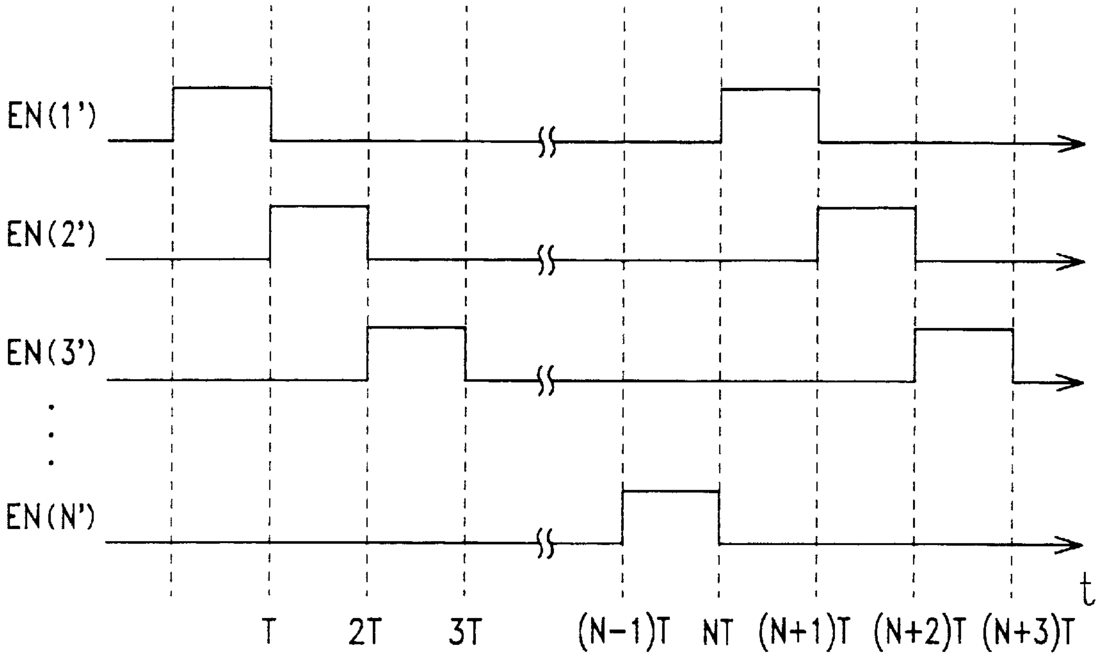
FIGS. 4A–4B are waveform diagrams, showing respectively the clock signals generated by the timers on the transmitting site and the receiving site.
Figure 4B:
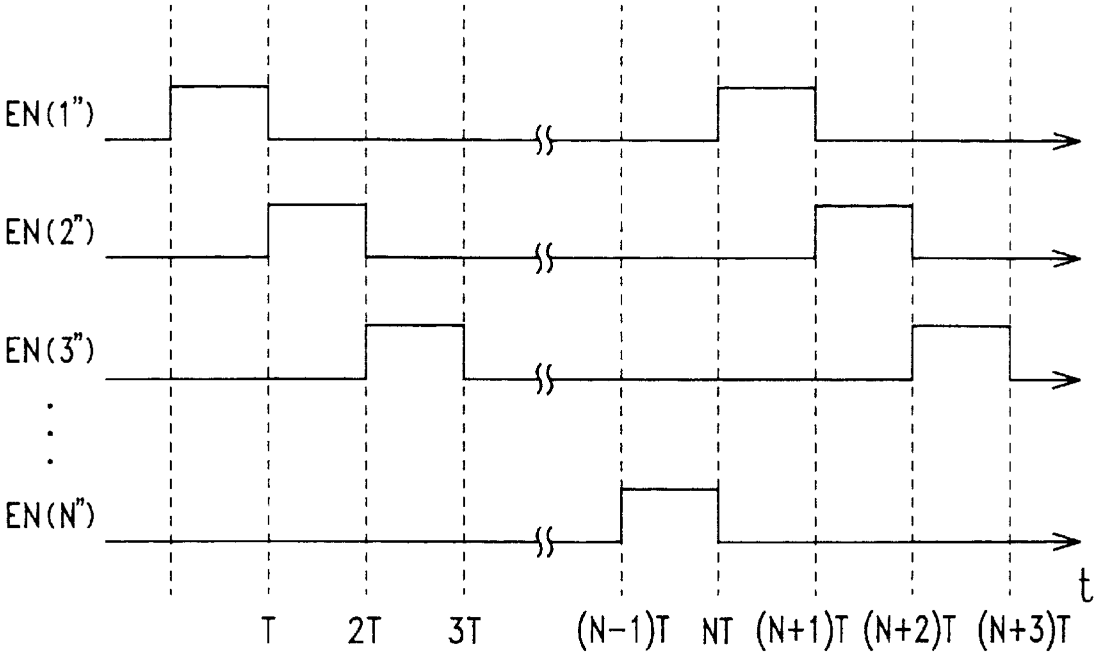

The transmitter 110 includes an encoding timer 111 and an array 112 of N encoding ROM modules ROM(1'), ROM(2'), . . . , and ROM(N'), each storing a different encoding method; and correspondingly the receiver 210 includes a decoding timer 211 and an array 212 of N decoding ROM modules ROM(1"), ROM(2"), . . . , and ROM(N"), each corresponding to different decoding method. The encoding timer 111 is used to generate a clock signal as shown in FIG. 4A that contains a series of pulses EN(1'), EN(2'), . . . , EN(N') generated at a predetermined frequency used to alternately enable ROM(1'), ROM(2'), . . . , and ROM(N'); and correspondingly the decoding timer 211 is used to generate a clock signal as shown in FIG. 4B that contains a series of pulses EN(1"), EN(2"), . . . , EN(N") generated at a predetermined frequency used to alternately enable ROM (1"), ROM(2"), . . . , and ROM(N"). Both of the timers 111, 211 use crystal oscillators 111*a*, 211*a* that are of conventional type to generate the clock pulses.

Fundamentally, the encoding timer 111 and the decoding timer 211 are operated at the same rates (but with a slight deviation according to the present invention which will be described later), and in order to decode the received data correctly, the clock signal generated by the decoding timer 211 must be in synchronization with that generated by the decoding timer 211. The clock signals shown in FIG. 4A and FIG. 4B are in complete synchronization. If the decoding clock signal is out of synchronization with the encoding clock signal, received data will not decoded correctly. Based on this, if the decoding timer 211 is operated at a frequency slightly deviated from that of the encoding timer 111, the deviation will be accumulated and eventually cause the decoding clock signal to be out of synchronization with the encoding one after a certain period of time.

Accordingly, it is an important aspect of the present invention that the encoding timer 111 is operated at a frequency deviated from that of the decoding timer 211 by a specific difference based on the authorized period given to the subscriber. Such a deviation can be directly obtained from manufacture error in the oscillation frequency of the crystal oscillators. The manufacture error may be only a few parts per million (ppm, 1 ppm corresponds to a time deviation of $10^{-6}$ second in one second), but it can be accumulated to a significant amount of time deviation after a long period of time. For example, for a manufacture error of 1 ppm, the time deviation after one year will be:

$$10^{-6}\times60\times60\times24\times365=31.5 \text{ seconds,}$$

which is quite a significant amount.

Based on the foregoing principle, the encoding timer 111 can be selected from one that has a manufacture error that will cause the decoding clock signal to be out of synchronization with the encoding clock signal after the period of authorized period expires.

Figure 5A:
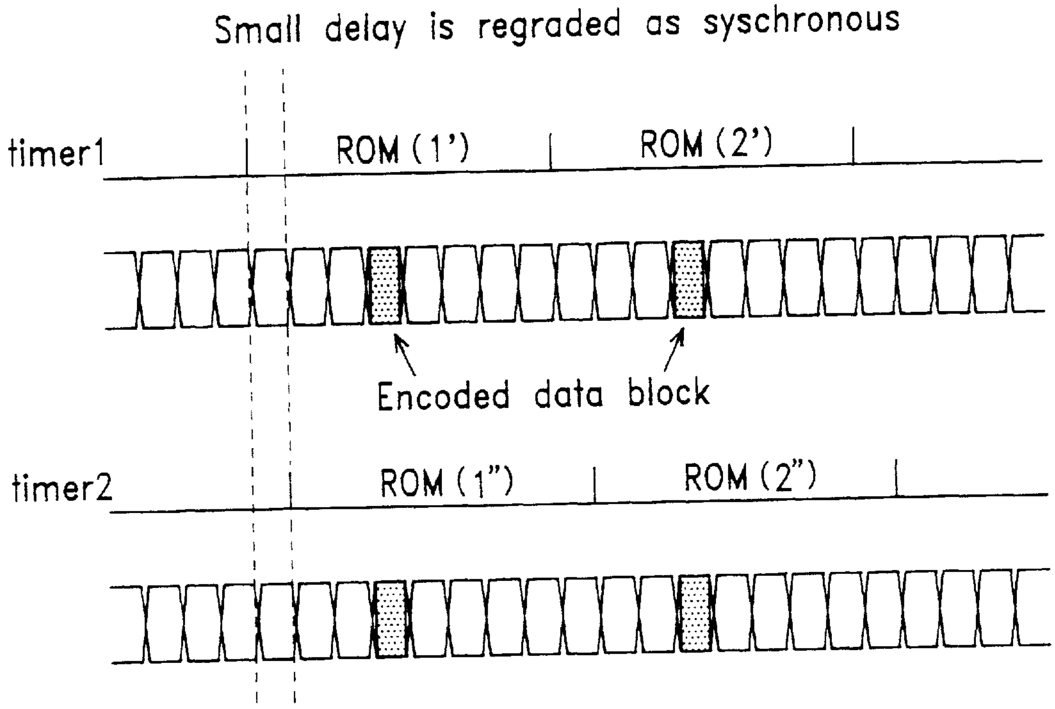

FIG. 5A is a waveform diagram showing the transmitted data packets and the received ones when the two clock signals generated respectively by the decoding timer 211 and encoding timer 111 are in synchronization. The shaded data packets in the waveform diagram represent the encoded ones that carry the broadcast game software. To decode the received signal correctly, each data packet must be decoded by the corresponding encoding ROMs. For example, the data packet encoded by ROM(1') must be decoded by the corresponding ROM(1"); otherwise, if decoded by the succeeding ROM(2') or the preceding ROM(N'), the output will be incorrect data. Therefore, in order to allow the received data packets to be decoded by the corresponding decoding ROMs, it is essential that the decoding timer 211 and the encoding timer 111 be in synchronization so that the corresponding decoding ROM modules ROM(1"), ROM(2"), . . . , and ROM(N") can be enabled to decode the received data packets.

Figure 6:
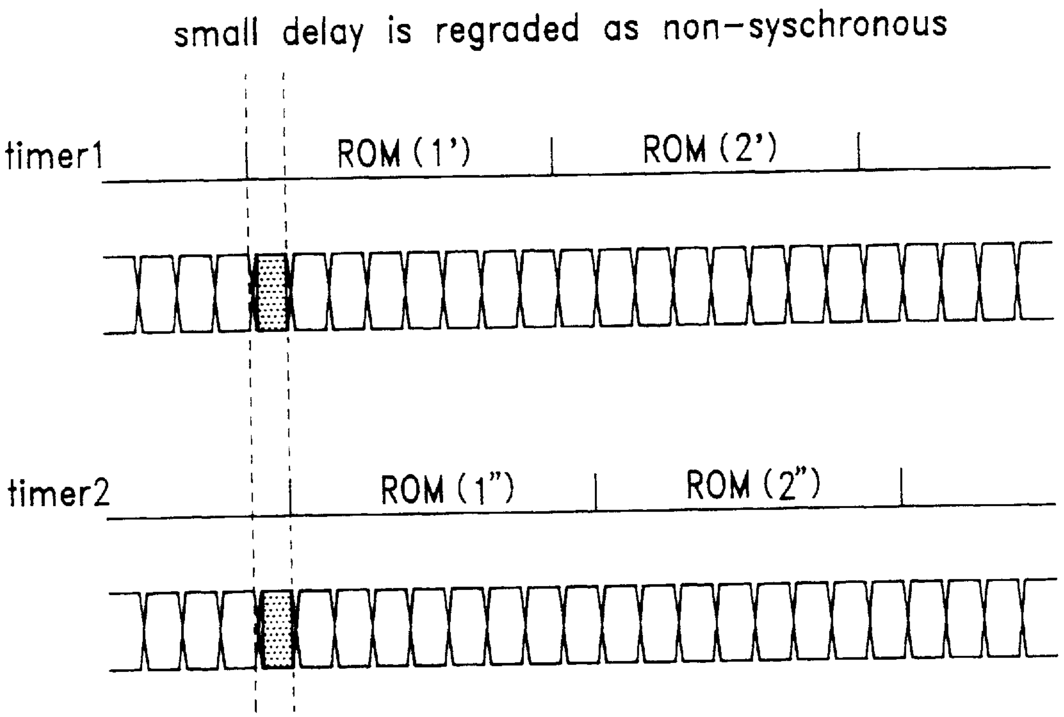
FIG. 6 is a waveform diagram used to depict the reason why only part of data packet is encoded and decoded in the apparatus according to the present invention.

Obviously, it would be impractical to decode all of the data packets that are generated during one encoding period. As the example depicted in FIG. 6, if all of the data packets generated during one encoding period are to be decoded, then even the slightest out-of-synchronization will cause the data packet that is encoded by ROM(1') (the shadowed data packet) to be decoded by ROM(N") and, consequently, the output will be incorrect data. Therefore, from the many data packets that are being generated during one encoding period, the transmitting site can selectively choose one appropriate data packet for carrying the encoded game software. This approach allows a wider margin for the selected data packet to become out of synchronization. A flag in each data packet can be used to indicate whether that data packet carries encoded game software. In preferred embodiment, the data packet with a specific data packet number is selected.

Accordingly, as the example shown in FIG. 5A, if the oscillator frequency deviation between the receiving-site timer 211 and the transmitting-site timer 111 at the time of reception causes only a small amount of delay that is still below a specific limit, the selected data packet encoded by the ROM(1') still can be decoded by the corresponding ROM(1"), thus the data packet can be decoded correctly. A benefit of using the flag to tag the encoded data packet is that the transmitting site can dynamically choose whether encoding is to be performed to a data packet and which data packet is to be encoded. This benefit would contribute to the complexity of the system such that it is more difficult to be intruded for unauthorized reception.

Figure 5B:
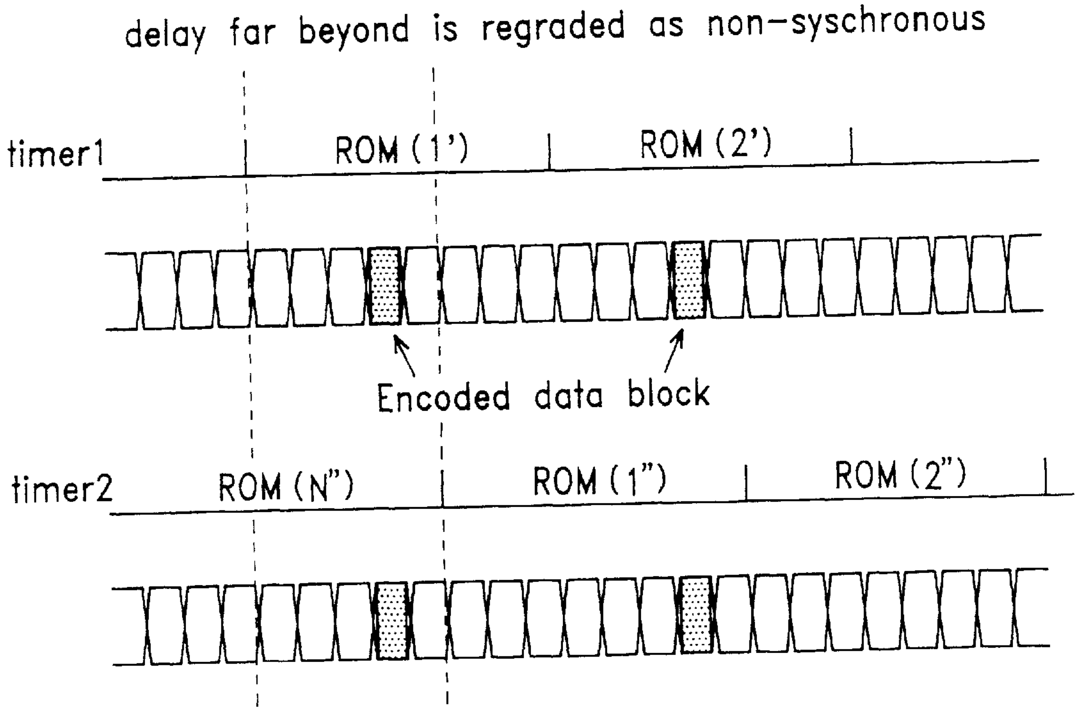

By contrast, as shown in FIG. 5B, when the delay finally reaches a certain amount exceeding the preset limit, it will cause the decoding clock signal to be out of synchronization with the encoding clock signal. At this time, the data packet encoded by ROM(1') is decoded by ROM(N") and thus the decoded output is incorrect. The game machine 300 thus hereinafter cannot download correct game program of the broadcast software into its memory to play the game.

In this case, if the subscriber wishes to renew the subscription so as to gain another period of authorized reception, he/she can make a renewal call to the service company and the software broadcasting station 100 will command a synchronization controller 113 to send a resetting signal via the channel to reset the decoding timer 211 back to synchronization with the encoding timer 111. In practice, since the resetting signal is sent along with the broadcast software which can be received by all subscribers, a subscriber ID code can be included in the resetting signal such that only the game machine having that subscriber ID code can receive the resetting signal. Besides, the sequence of the decoding ROMs on the transmitting site can be dynamically altered so as to make the system more difficult to be illegally hacked.

In the foregoing embodiment ROMs are used for the encoding and decoding of the broadcast game software. However, in practice, other circuit means as random logic circuits, RAMs, or software can also be used for the implementation.

The present invention has been described hitherto with exemplary preferred embodiments. However, it is to be understood that the scope of the present invention need not be limited to the disclosed preferred embodiments. On the contrary, it is intended to cover various modifications and similar arrangements within the scope defined in the following appended claims. The scope of the claims should be accorded the broadest interpretation so as to encompass all such modifications and similar arrangements.

What is claimed is:

1. A method for use on a broadcasting system transmitting digital information from a transmitting site to a receiving site for purpose of protecting transmitted digital information against unauthorized reception after a prescribed period of authorized reception expires, said method comprising the following steps of:

(1) encoding the digital information by using one of a plurality of encoding methods, each of the encoding methods being enabled by a first time base;

(2) transmitting the encoded digital information via a channel to the receiving site;

(3) receiving the encoded digital information at the receiving site; and (4) decoding the received digital information by using one of a plurality of decoding methods, each the decoding methods being enabled by a second time base, the first time base and the second time base being initially synchronized but having different clock rates to cause the first time base and the second time base to become out of synchronization after said prescribed period, decoded output of each the decoding methods being correct if the second time base is substantially synchronized with the first time base, and the decoded output of each the decoding methods being incorrect if the second time base is out of synchronization with the first time base.

2. A method as claimed in claim 1, wherein the first time base is a first clock signal of first frequency and the second time base is a second clock signal of second frequency having a predetermined deviation from the first frequency and initially set in synchronization with the first clock signal.

3. A method as claimed in claim 1, further comprising a step of initially setting the decoding clock signal in synchronization with the encoding signal before said Step (1).

4. A method as claimed in claim 1, further comprising a step of resetting the decoding clock signal in synchronization with the encoding clock signal after said Step (1) so as to make a renewal authorization.

5. A method as claimed in claim 4, wherein in said resetting step a resetting signal containing a subscriber ID is used to reset the decoding clock signal in synchronization with the encoding clock signal.

6. A method for use on a broadcasting system transmitting game software from a transmitting site to a receiving site for purpose of protecting transmitted game software against unauthorized reception after a prescribed period of authorized reception expires, said method comprising the following steps of:

(1) encoding the game software by using one of a plurality of encoding methods, each of the encoding methods being enabled by a first time base;

(2) transmitting the encoded game software via a channel to the receiving site;

(3) receiving the encoded game software at the receiving site; and (4) decoding the received game software by using one of a plurality of decoding methods, each the decoding methods being enabled by a second time base, the first time base and the second time base being initially synchronized but having different clock rates to cause the first time base and the second time base to become out of synchronization after said prescribed period, decoded output of each the decoding methods being correct if the second time base is substantially synchronized with the first time base, and the decoded output of each the decoding methods being incorrect if the second time base is out of synchronization with the first time base.

7. A method as claimed in claim 6, wherein the first time base is a first clock signal of first frequency and the second time base is a second clock signal of second frequency having a predetermined deviation from the first frequency and initially set in synchronization with the first clock signal.

8. A method as claimed in claim 6, further comprising a step of initially setting the decoding clock signal in synchronization with the encoding signal before said Step (1).

9. A method as claimed in claim 6, further comprising a step of resetting the decoding clock signal in synchronization with the encoding signal after said Step (1) so as to make a renewal authorization.

10. A method as claimed in claim 6, wherein in said resetting step a resetting signal containing a subscriber ID is used to reset the decoding clock signal in synchronization with the encoding clock signal.

11. An apparatus for use on a game software broadcasting system transmitting game software from a transmitting site to a receiving site coupled to a game machine for purpose of protecting broadcast game software against unauthorized reception after an authorized period of reception expires, said apparatus comprising:

(a) encoding means, provided on the transmitting site, for encoding the game software by using one of a plurality of encoding modules, each the encoding modules being enabled by an encoding clock signal;

(b) encoding timer means, coupled to said encoding means, for generating said encoding clock signal at an encoding frequency for clocking off said encoding means;

(c) transmitting means for transmitting encoded game software via a channel to the receiving site;

(d) decoding means, provided on the receiving site, for decoding received data of the game software by using one of a plurality of decoding modules, each of the decoding modules being enabled by a decoding clock signal;

(e) decoding timer means, coupled to said decoding means, for generating said decoding clock signal at a decoding frequency for clocking off said decoding means, the encoding clock signal and the decoding clock signal being initially synchronized but having different clock rates to cause the decoding clock signal to become out of synchronization with the encoding clock signal after said authorized period, decoded output of the decoding means being correct if the decoding clock signal is substantially synchronized with the encoding clock signal, and the decoded output of the decoding means being incorrect if the decoding clock signal is out of synchronization with the decoding clock signal; and (f) synchronization controlling means for setting said encoding timer means and said decoding timer means in synchronization with each other.

12. An apparatus as claimed in claim 11, wherein the frequency of the decoding clock signal is predetermined to have a specific deviation from the frequency of the encoding clock signal based on the prescribed period of authorized use.

13. An apparatus as claimed in claim 11, wherein said synchronization controlling means generates an initializing signal which sets said decoding timer means in synchronization with said encoding timer means when a new subscription begins.

14. An apparatus as claimed in claim 11, wherein said synchronization controlling means generates a resetting signal which resets said decoding timer means back into synchronization with said encoding timer means when a renewal subscription begins.

15. An apparatus as claimed in claim 14, wherein the resetting signal includes a subscriber ID code.

16. The apparatus of claim 11, wherein said plurality of encoding modules include a plurality of encoding ROM modules, each of the encoding ROM modules corresponding to an encoding method, said plurality of encoding ROM modules being enabled sequentially by said encoding timer means so as to generate a series of data packets by carrying the digital information to the receiving site; and said plurality of decoding modules include a plurality of decoding ROM modules, each of the encoding ROM modules corresponding to a decoding method, said plurality of decoding ROM modules being enabled sequentially by said decoding timer means so that each data packet is decoded by a corresponding decoding ROM module.

17. An apparatus as claimed in claim 16, further comprising means for dynamically altering the enabling sequence of said encoding ROMs.

18. An apparatus as claimed in claim 11, wherein said channel is a cable TV network.

19. An apparatus as claimed in claim 11, wherein said channel is a direct broadcast satellite (DBS).

20. An apparatus as claimed in claim 11, wherein the decoding clock signal generated by said decoding timer means is used by the game machine.

21. A method for use on a broadcasting system transmitting game software from a transmitting site to a receiving site for purpose of protecting transmitted game software against unauthorized reception after a prescribed period of authorized reception expires, said method comprising the following steps of:

(1) initializing a decoding clock signal in synchronization with an encoding clock signal;

(2) encoding the game software by using one of a plurality of encoding methods, each of the encoding methods being enabled by an encoding clock having a first frequency signal on the transmitting site;

(3) transmitting the encoded game software via a channel to the receiving site;

(4) decoding the received game software by using one of a plurality of decoding methods, each the decoding methods being enabled by a decoding clock signal at a second frequency having a predetermined deviation from the first frequency and initially set in synchronization with the encoding clock signal, the encoding clock signal and the decoding clock signal becoming out of synchronization according to the frequency deviation, the deviation between the second frequency and the first frequency causing the decoding clock signal to be out of synchronization with the encoding clock signal beyond the prescribed period of authorized reception, thereby rendering the receiving site unable to decode the received game software; and (5) when renewal is authorized, transmitting a resetting signal containing a subscriber ID to set the decoding clock signal in synchronization with the encoding clock signal.

22. A method for use on a game software broadcasting system, capable of making an on-line renewal of license authorization when a license given to a subscriber expires, said method comprising the following steps of:

(1) initializing a decoding clock signal in synchronization with an encoding clock signal;

(2) encoding the game software by using one of a plurality of encoding methods, each the encoding methods being enabled by the encoding clock signal on the transmitting site having a first frequency;

(3) transmitting the encoded game software via a channel to the receiving site;

(4) decoding the received game software by using one of a plurality of decoding methods, each the decoding methods being enabled by the decoding clock signal at a second frequency having a predetermined deviation from the first frequency and initially set in synchronization with the first clock signal, the encoding clock signal and the decoding clock signal becoming out of synchronization according to the frequency deviation, the deviation between the second frequency and the first frequency causing the decoding clock signal to be out of synchronization with the encoding clock signal beyond the prescribed period of authorized reception, thereby rendering the receiving site unable to decode the received game software; and (5) when renewal is authorized, transmitting a resetting signal containing a subscriber ID to set the decoding clock signal in synchronization with the encoding clock signal.

23. A method for use on a broadcasting system transmitting digital information from a transmitting site to a receiving site, capable of protecting transmitting digital information against unauthorized reception, said method comprising the following steps of:

(1) setting at least one data packet for carrying encoded game software during a specific time interval;

(2) encoding the selected data packet by using one of a plurality of encoding methods, each the encoding methods being enabled by a first time base;

(3) transmitting the encoded data packet;

(4) receiving the encoded data packet; and (5) decoding the received data packet by using one of a plurality of decoding methods, each the decoding methods being enabled by a second time base, the first time base and the second time base being initially synchronized but having different clock rates to cause the first time base and the second time base to become out of synchronization after a prescribed period, in which process a time delay below a preset limit will not cause a synchronization mismatch between received data and transmitted data, and a time delay exceeding the preset limit will cause an out-of-synchronization between the received data and transmitted data, thus causing transmission error.

24. A method as claimed in claim 23, wherein in said Step (1) the specific time interval is used to control expiration time of authorized reception.

25. A method as claimed in claim 23, wherein deviation between the first time base and the second time base is used to control expiration time of authorized reception.

26. A method as claimed in claim 23, wherein the selected data packet has a flag used to indicate that the selected data packet carries encoded game software.

27. A method as claimed in claim 23, wherein in Step (1) a data packet with a specific data packet number is selected.

* * * * *